US005291228A

United States Patent [19]

Tetsuya et al.

[11] Patent Number: 5,291,228

[45] Date of Patent: Mar. 1, 1994

[54] IMAGE FORMATION APPARATUS HAVING TUCK PREVENTION CONTROL MEANS

[75] Inventors: Nagata Tetsuya, Hitachi; Umeda Takao, Mito; Takuma Yasuo, Hitachi; Igawa Tatsuo, Kitaibaraki; Yamada Masato, Katsuta, all of Japan

[73] Assignees: Hitachi, Ltd.; Hitachi Koki Co., Ltd., both of Tokyo, Japan

[21] Appl. No.: 845,328

[22] Filed: Mar. 3, 1992

[30] Foreign Application Priority Data

Mar. 7, 1991 [JP] Japan ................................ 3-065226

[51] Int. Cl.$^5$ ...................... G01D 15/06; G03G 21/00

[52] U.S. Cl. ................................ 346/153.1; 355/207; 355/208; 395/114

[58] Field of Search ...................... 355/208, 315, 207; 395/114; 346/153.1

[56] References Cited

U.S. PATENT DOCUMENTS

| | | | |
|---|---|---|---|
| 4,113,374 | 9/1978 | Nakamura et al. | 355/308 |
| 4,538,902 | 9/1985 | Inuzuka et al. | 355/208 X |
| 4,945,386 | 7/1990 | Ito et al. | 355/218 |
| 5,200,784 | 4/1993 | Kimura et al. | 355/315 |

*Primary Examiner*—George H. Muller, Jr.
*Attorney, Agent, or Firm*—Kenyon & Kenyon

[57] ABSTRACT

In an image formation apparatus, a drum tuck prevention element prevents a cut paper, which is a transfer material, which is an image holding means, from being wound on a photosensitive drum with an electrostatic state. The drum tuck prevention element detects, according to various physical information, the occurrence of a drum tuck. The drum tuck prevent element includes a tuck estimation judgment element which produces drum tuck prevention control information in response to the physical information. The physical information can be selected from a digital data for exposing the drum, temperature and humidity data obtained by detection in an area surrounding of an apparatus main body, data for indicating a residual amount of a development element, data for detecting an electrostatic latent image formed on the drum and data for indicating a visual image formed on a surface of the drum.

28 Claims, 10 Drawing Sheets

IMAGE FORMATION APPARATUS HAVING TUCK PREVENTION CONTROL MEANS

BACKGROUND OF THE INVENTION

The present invention relates to an image formation apparatus having a tuck prevention mechanism and, more particularly to an image formation apparatus having an improved tuck prevention control mechanism that prevents a tuck of a transfer material to an image holding body.

The present invention relates to an image formation apparatus, such as a laser beam printer using an electrostatographic method, having a tuck prevention control mechanism that prevents a tuck state on an image holding body to a transfer material and, more particularly to an image formation apparatus having an improved tuck prevention control mechanism that prevents an occurrence of a tuck state on a photosensitive body drum to a cut paper.

One kind of a conventional image formation apparatus structure is shown in FIG. 21, such an image formation apparatus is disclosed in Japanese Patent Laid-Open No. 172369/1982. In FIG. 21, the image formation apparatus mainly comprises a photosensitive body drum 1, an electrostatic charger 102, an exposure device 103, a development device 104, a transfer electrostatic charger 105, an erase lamp 106, a cleaner 107, a belt cleaner 108, a transfer material 109, a transfer material transportation belt 100, rollers 111, 112 and 113, a preliminary electrostatic charger 114, a ground roller 115 and an electrostatic discharger 116.

The above stated conventional image formation apparatus structure carries out the following motions. First of all, electric charging is given uniformly on a surface of the photosensitive body drum 1 by the electrostatic charger 102. After that, the light corresponding to the image to be formed is irradiated on the surface of the photosensitive body drum 101 from the exposure device 103 and the electrostatic latent image is formed on the surface of the photosensitive body drum 101.

The development device 104 stores an image formation medium (e.g., toners) In its interior portion. Those toners are given constant charge values in accordance with the triboelectric charging characteristic. Those toners are adhered on the surface of the photosensitive body drum 1 by the electrostatic force according to the above stated electrostatic latent image and then the visual image is formed on the surface of the photosensitive body drum 1.

The transfer material 109, such as a cut paper, is supplied into the image formation apparatus from a direction A as shown in FIG. 21. The transfer material 109 is loaded on the transfer material transportation belt 100 and transported by this transfer material transportation belt 100.

In this conventional image formation apparatus, since the transfer material transportation belt 100 and the transfer material 109 are adhered by the electric charging having the reversal polarity characteristic by the preliminary electrostatic charger 114 and the ground roller 115, the transfer material 109 is transported under the condition in which the transfer material 109 is absorbed by the transfer material transportation belt 100.

In a nip region in which the photosensitive body drum 1 and the transfer material transportation belt 100 make contact, since by the transfer electrostatic charger 105 the transfer material transportation belt 100 is given the reversal polarity electric charging against the polarity of the electric charging of the image formation medium (the toners), the toners on the photosensitive body drum 101 are transferred to the nip region. The transfer material 109 onto which surface the visual image has been transferred, is removed by the electric charging by the electrostatic discharger 116 in which the high alternative current is supplied.

After the transfer material 109 is separated at a portion of the roller 112 from the transfer material transportation belt 100, the transfer material 109 is transported toward a direction B as shown in FIG. 21. By fusing the toners according to a fixing element (not shown), the image is fixed on the surface of the transfer material 109.

During this process, the residual electric charging on the surface of the photosensitive body drum 101 is discharged with electric charge by the erase lamp 106 and the residual toners are removed by the cleaner 107 and the image formation apparatus then waits for next image formation. The scattered toners on the transfer material transportation belt 100 are removed by the belt cleaner 108.

FIG. 22 shows another conventional image formation apparatus structure having a drum tuck prevention element. In FIG. 22, the image formation apparatus has a claw 117 for peeling off the transfer material 109. The residual construction elements excluding the peel-off craw 117 in this image formation apparatus shown in FIG. 22 are same those construction elements in the image formation apparatus shown in FIG. 21. Generally, the reference number of the elements shown in FIG. 22 are the same as the corresponding elements shown in FIG. 21.

The image formation motions of this conventional image formation apparatus having the drum tuck prevention element shown in FIG. 22 are basically the same as those of the image formation apparatus shown in FIG. 21.

In this latter conventional image formation apparatus shown in FIG. 22, when wrapping by the transfer material 109 (the drum tuck phenomenon) occurs, in other words when the transfer material 109 is wrapped on the photosensitive body drum 101 according to some cause, the transfer material 109 is subsequently peeled off by the peel-off claw 117 which is in contact with o is disposed near the photosensitive body drum 1. Accordingly, comparing this device with the former image formation apparatus the occurrence of the drum tuck can be prevented in this later image formation apparatus.

In the former conventional image formation apparatus shown in FIG. 21, the occurrence of drum tuck or the tucking of the transfer material 109 to the photosensitive body drum 101 may be lowered with an electrostatic state, for example by increasing the electric charging amount of the preliminary electrostatic charger 114. However, the complete prevention of the occurrence of drum tuck is insufficient. Accordingly, at all times this former conventional image formation apparatus gives cause for anxiety about the drum tuck.

Even in the latter conventional image formation apparatus, where the drum tuck prevention element, the peel-off claw 117 provided to contact to or is disposed near the photosensitive body drum 101 to peel the transfer material from the photosensitive body drum 101, there are inconveniences. Namely, when the transfer material 109 is peeled off from the photosensitive body drum 101, the drum tuck prevention element disturbs the image on the photosensitive body drum 101 or due to contact with the peel-off claw 117 the photosensitive body drum 101 is damaged and this deteriorates the image during the after transfer process.

Further, even in the later image formation apparatus having the drum tuck prevention means, the degree to which the goal of preventing the drum tuck operation is achieved differs with each image formation apparatus according to the use frequency and the age and deterioration etc. In the image formation apparatus there is an inconvenience that the service man must to go to inspect regularly the image formation apparatus regardless of the success of the drum tuck prevention means operation.

SUMMARY OF THE INVENTION

As the causes of the occurrence of the drum tuck in the image formation apparatus, there has existed the already explicated portion in the transfer material. The explicated portion is, for example when cut paper is used as the transfer material the more the cut paper is thin and has stiffness or straightness and the more the curve radius of the photosensitive body drum is large, many drum tucks occur.

The inventors of the present invention performed repeatedly various experimentation relating to the occurrence of the drum tuck and as a result they discovered that drum tucks occur often in various following cases.

(1) A case that the adhere amount of the image formation medium (toners) does not have many on the photosensitive body drum. In other words, when the black color toners are used as the image formation medium and during the transfer process the image becomes to have much no toner adhesion portion in the cut paper used as the transfer material;

(2) A case that the temperature and the humidity surrounding the apparatus main body of the image formation apparatus are low and further the moisture content of the transfer material is low;

(3) A case that when cut paper is used as the transfer material and further the droop portion of the cut portion of the tip-end of the cut paper is arranged to face toward a side of the transfer material transportation belt.

The above stated experimentation by the inventors of the present invention was carried out under the condition that the photosensitive drum body is charged at a minus side and reversal development is carried out, however it will be understood clearly that a similar result can be obtained in other cases as well.

An object of the present invention is to provide an image formation apparatus having a tuck prevention control element wherein in an image formation apparatus a high reliability and a high image quality of an image transfer can be carried out.

Another object of the present invention is to provide an image formation apparatus having a tuck prevention control element wherein in the image formation apparatus an occurrence of a tuck can be prevented completely without an inferior image transfer.

A further object of the present invention is to provide an image formation apparatus having a tuck prevention control element wherein an occurrence of a tuck can be prevented from occurring.

A further object of the present invention is t provide an image formation apparatus having a tuck prevention control element wherein in the image formation apparatus an occurrence of a drum tuck of a transfer material to a photosensitive body drum as an image holding body can be prevented completely without an inferior image transfer.

A further object of the present invention is to provide an image formation apparatus having a tuck prevention control element wherein an occurrence of a drum tuck of a transfer material to a photosensitive body drum as an image holding body can be prevented from occurring.

A further object of the present invention is to provide an image formation apparatus combination network wherein maintenance and service of the image formation apparatus can be improved.

A further object of the present invention is to provide an image formation apparatus having a drum tuck prevention control element wherein the image formation apparatus includes a network means than can receive drum tuck prevention information from a centralized control center.

In accordance with the present invention, an image formation apparatus having a tuck prevention control means comprises an image holding body, an image formation means for forming a visual image on the image holding body, a transfer material transportation means for transporting a transfer material to a transfer portion by supporting the transfer material, a transfer means for transferring the visual image which is formed on the image holding body to the transfer material, and a tuck prevention control element that prevents transporting the transfer material by supporting the image holding body after the transfer material has passed through the transfer portion.

In accordance with the present invention, an image formation apparatus having a drum tuck prevention control element comprises a photosensitive body drum, an image formation element for forming a visual image on the photosensitive body drum, the image formation element including an electrostatic charger; an exposure element; and development device, a cut paper transportation belt for transporting cut paper to a transfer portion by supporting the cut paper, a transfer electrostatic element for transferring the visual image which is formed on the photosensitive body drum to the cut paper, and a drum tuck prevention control element for preventing from transporting the cut paper by supporting the photosensitive body drum after the cut paper has passed through the transfer portion.

The tuck prevention control element includes a tuck estimation judgment element which detects various kinds of physical information relating to a tuck occurrence and generates tuck control prevention control information in response to certain physical information.

In accordance with the present invention, the physical information relating to the tuck occurrence is selected from one of a digital data for exposing the image holding body, temperature and humidity data v detected in a interior of an apparatus main body of the image information apparatus, data indicating a residual amount of a development means of the image information apparatus, data indicating an electrostatic latent image which is formed on a surface of the image holding body, data indicating a visual image which is formed on a surface of the image holding body, digital data for exposing the image holding body and a temperature and humidity data detected in a interior of an apparatus main body of the image information apparatus, digital data for exposing the image holding body and data for indicating a residual amount of a development means of the image information apparatus.

The drum tuck prevention control element includes a tuck estimation judgment element and the tuck estimation judgement element detects various kinds of a physical information relating to a drum tuck occurrence and generates a drum tuck control prevention control information in response to the physical information.

In accordance with the present invention, an image formation apparatus having a drum tuck prevention control element comprises a network device for constituting a network and is combined through a communication interface and a centralized control center, and a drum tuck prevention control means.

The image formation apparatus receives an information relating to a drum tuck prevention from the centralized control center and modifies suitably a condition for preventing the drum tuck in response to the received information.

The tuck estimation judgment element used in the tuck prevention control element of the image formation apparatus according to the present invention detects at least one value indicating the above stated various physical phenomena which are the main cause of the occurrence of drum tuck and according to such an obtained detection value the tuck estimation judgment means estimates whether or not to operate the tuck prevention control element.

When the estimation for operating the tuck estimation judgment element is obtained, the tuck estimation judgment control generates the tuck estimation control information and according to this tuck estimation judgment control information the tuck prevention control element is driven, thereby the occurrence of the drum tuck can be prevented.

According to the present invention, since in the tuck prevention control means the tuck estimation judgment means for detecting the various physical information relating to the occurrence of the drum tuck and for generating the tuck prevention control information in response to the physical information is provided, it can estimate the condition in which the drum tuck may occur easily in advance. According to the above estimation the tuck prevention element in the tuck prevention control element is made to operate, thereby the occurrence of the drum tuck can be prevented from occurring without degrading the image.

In accordance with the present invention, an image formation apparatus having a drum tuck prevention control element comprises a network means for constituting a network and is combined through a communication interface and a centralized control center and a drum tuck prevention control means.

In accordance with the present invention, an image formation apparatus combination network comprises a network constituted at least one image formation apparatus having a tuck prevention control means and a communication interface and a centralized control center.

The centralized control center receives information relating to a tuck prevention from each image formation apparatus and modifies suitably a condition for preventing the tuck in every image formation apparatus each in response to the received information.

Since one or more image information apparatuses are combined to the centralized control center together through the communication electric lines, at the centralized control center the working condition and the tuck prevention effect of each of the image formation apparatuses can be grasped.

Further, under the basis of the grasp since the tuck prevention motion suitable to each of the image information apparatuses can be reset, the service man for adjusting and mending the image formation apparatus can be arranged and dispatched effectively.

DETAILED DESCRIPTION OF THE INVENTION

One embodiment of an image formation apparatus having a tuck prevention control element according to the present invention will be explained referring to drawings.

Figure 1:
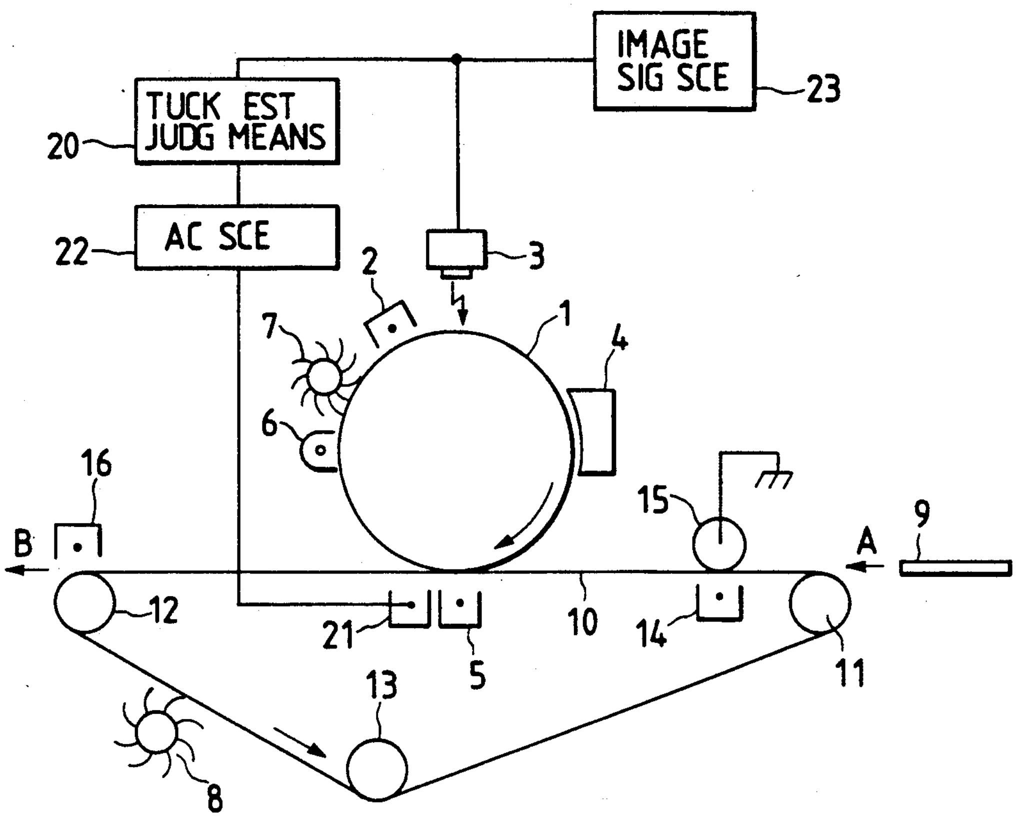
FIG. 1 is a schematic construction view showing a first embodiment of an image formation apparatus having a tuck prevention control means according to the present invention.

FIG. 1 is a schematic construction view showing a first embodiment of an image formation apparatus having a tuck prevention control element according to the present invention.

In the first embodiment of the present invention shown in FIG. 1, a laser beam printer as the image formation apparatus comprises mainly a photosensitive body drum 1 as an image holding body, an electrostatic charger 2, an exposure means 3, a development means 4, a transfer electrostatic charger 5, an erase lamp 6, a cleaner 7, a belt cleaner 8, a transfer material 9, a transfer material transportation belt 10, rollers 11, 12 and 13, a preliminary electrostatic charger 14, a ground roller 15 and an electrostatic discharger 16.

In the first embodiment, as the transfer material 9, the use of the popular cut paper is exemplified. In FIG. 1, the image formation apparatus includes a tuck prevention control element which comprises a tuck estimation judgment element 20, a belt type electrostatic discharger 21 and a variable alternative current power source 22.

The tuck estimation judgment element 20 receives digital image data and generates a tuck prevention control information in response to the digital image data. The belt type electrostatic discharger 2i is put side by side with the transfer electrostatic charger 5 and in which the variable alternative current is supplied. The variable alternative current power source 22 controls the drive output according to the tuck prevention control information. An image signal source 23 supplies the digital image data to the exposure means 3.

Figure 21:
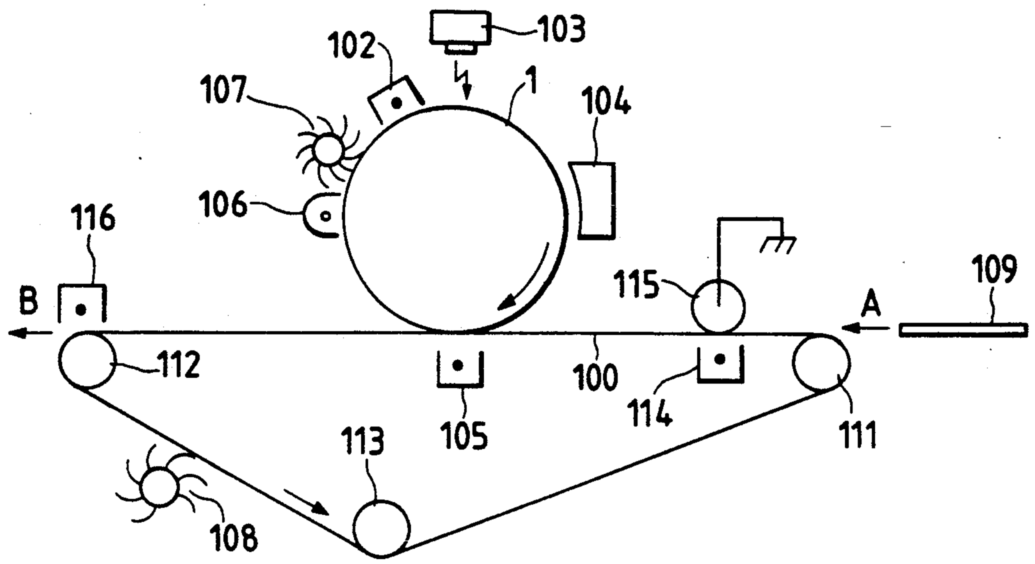
FIG. 21 (PRIOR ART)
FIG. 21 is a schematic construction view showing one example of a conventional image formation apparatus having no drum tuck prevention means.
Figure 22:
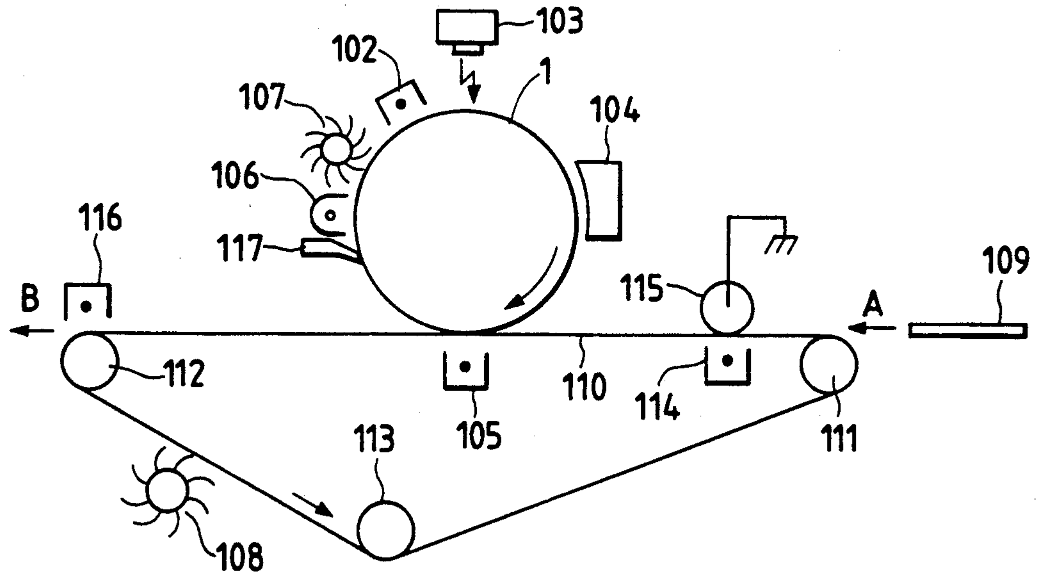
FIG. 22 (PRIOR ART)
FIG. 22 is a schematic construction view showing another example of a conventional image formation apparatus having a drum tuck prevention means.

The image formation motions in the image formation apparatus of this first embodiment according to the present invention shown in FIG. 1 are basically same to the image formation motions in the former conventional image formation apparatus shown in FIG. 21.

Further, in the image formation apparatus of this first embodiment according to the present invention, this image formation apparatus has the tuck prevention control element comprising the tuck estimation judgment element 20, the belt type electrostatic discharger 2 and the variable alternative current power source 22 etc. In a case that the digital image data from the image signal source 23 indicates a drum tuck is easy to occur, the above tuck prevention control element is operated immediately.

Hereinafter, the motions of the tuck prevention control element in the first embodiment of the image formation apparatus according to the present invention will be explained in detail.

In this first embodiment, in the image formation apparatus the image according to the digital image data from the image signal source 23 is transferred to the photosensitive body drum 1. In a case of the transfer of this image to the cut paper 9 as the transfer paper, the tuck estimation judgment element 20, continuously watches and the image formed from the above digital image data which is formed at a place within about 3 cm from the tip end of the cut paper 9.

During the image formation, for example, when a region is detected in which the black portions being adhered by the toners or the printing percentage are less than 1% as compared to the entire surface area, the tuck estimation judgment element 20 carries out the estimation that the drum tuck occurs. When the above estimation is carried out, the tuck estimation judgment element 20 produces the tuck prevention control information.

The tuck prevention control information is supplied to the variable alternating current power source 22, and the output alternating current of the variable alternating current power source 22 is placed in the condition temporarily.

The belt type electrostatic discharger 21 is placed in the electrostatic discharging state and electrostatic discharging is carried out in the area within about 3 cm from the tip end of the cut paper 9. Accordingly, the occurrence of drum tuck can be prevented before happens.

It is desirable to carry out the electrostatic discharging of the belt type electrostatic discharger 21 only when the area within about 3 cm from the tip end of the cut paper 9 passes through on the belt type electrostatic discharger 21.

In this first embodiment the prevention of the drum tuck is carried out in accordance with "on" or "off" control of the alternating current of the variable alternating current power source 22 for supplying the belt type electrostatic discharger 21.

However, in actuality since there is a comparative time delay from the "off" of the above alternating current power source 22 to the start of the electrostatic discharging action it can not carry out the drum tuck prevention control with a high speed. Accordingly, it is difficult to adopt this tuck prevention control device with an image formation apparatus having a high process speed.

Figure 2:
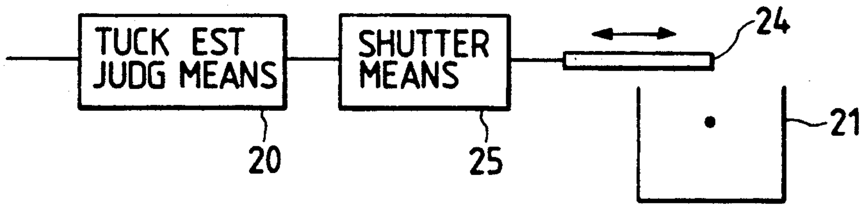
FIG. 2 is a block diagram view showing another belt type electrostatic discharger which is used in the first embodiment of the image formation apparatus shown in FIG. 1.

FIG. 2 is a block diagram showing another embodiment using the belt type electrostatic discharger 21 in which the drum tuck prevention control speed is improved. In this embodiment the image formation apparatus comprises the electrostatic discharger 21, a shutter 24 for opening or closing the electrostatic discharger 21 and a shutter open-close means 25 for driving the shutter 24.

In this embodiment shown in FIG. 2, when the tuck prevention control information is sent out from the tuck estimation judgment means 20, the shutter open-close means 25 is biased. By this bias operation of the shutter open-close means 25, since the shutter 24 is moved immediately on the belt type electrostatic discharger 21, a high speed tuck prevention control is carried out as compared with the above stated first embodiment shown in FIG. 1.

In this embodiment, when the corona current of the transfer electrostatic charger 5 is 400 μA and the current value of the belt type electrostatic discharger 21 is selected above 1200 μA, as to A4 size cut paper having the ream weight of 55 Kg, it can obtain a zero percent drum tuck occurrence rate.

Figure 3:
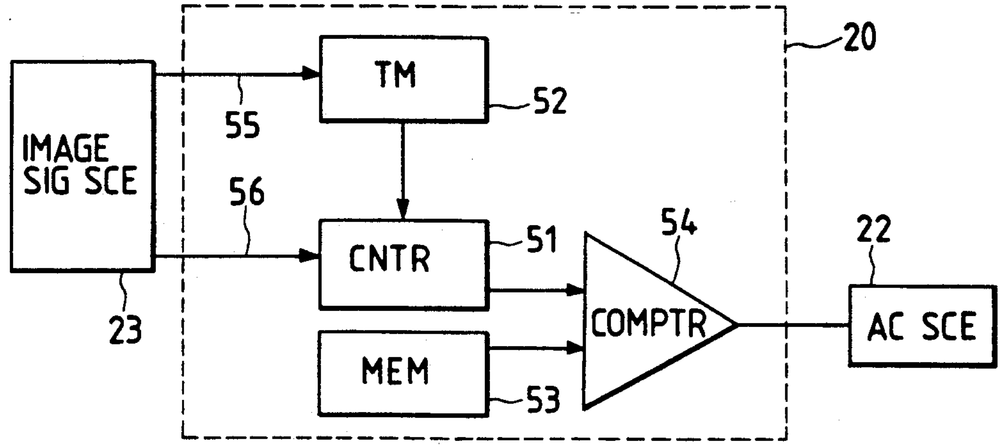
FIG. 3 is a block diagram showing an example of a tuck estimation judgment element which is used in the image formation apparatus according to the present invention.

FIG. 3 is a block diagram showing a tuck estimation judgment element 20 for use in the present invention. The tuck estimation judgment element 20 comprises a counter 50, a timer 52, a memory 53 and a comparator 54. The image signal source 23 supplies a print start signal 55 and a print image signal 56 as the digital image data to the tuck estimation judgment element 20.

The operation of the above stated tuck estimation judgment element is as follows.

In the photosensitive body drum 1, every time a data signal of "1" within the digital image data of the print image signal 56 is sent to the exposure means 3, a dot having one dot part is adhered to the photosensitive body drum 1. When a "1" signal Of the print image signal is not sent, no toner adheres to the photosensitive body drum 1. The timer 52 is set to operate with a predetermined time, after the trigger motion. Such a time corresponds to the transfer time of the image with the portion about 3 cm from the tip end of the cut paper 9.

The counter 51 counts the number of "1" data signals of the print image signal 56 during the operation period of the timer 52. The memory 53 stores a number corresponding to that number of "1" data signals that should occur for a 1% incidence of such signals within the time corresponding to the transfer time of the image.

When the timer 52 is triggered by the supply of the print start signal 55, the counter 51 counts the number of "1" of the print image signal 56. When the timer 52 passes over the set time of the timer 52, the counter 51 stops counting.

At this time, the comparator 53 compares the count number of the counter 51 with the number stored in the memory 53. When the count number of the counter 51 is equal to or smaller than the store number in the memory 53, the estimation element generates the tuck prevention control information for driving the variable alternating current power source 22.

This time, even when the counter 51 cannot count the total number of "1" data signals (black portions) of the print image signal 56 within the time corresponding to the transfer time of the image, it can allow to use a counter which can count to at least the number stored in the memory 53.

Figure 4:
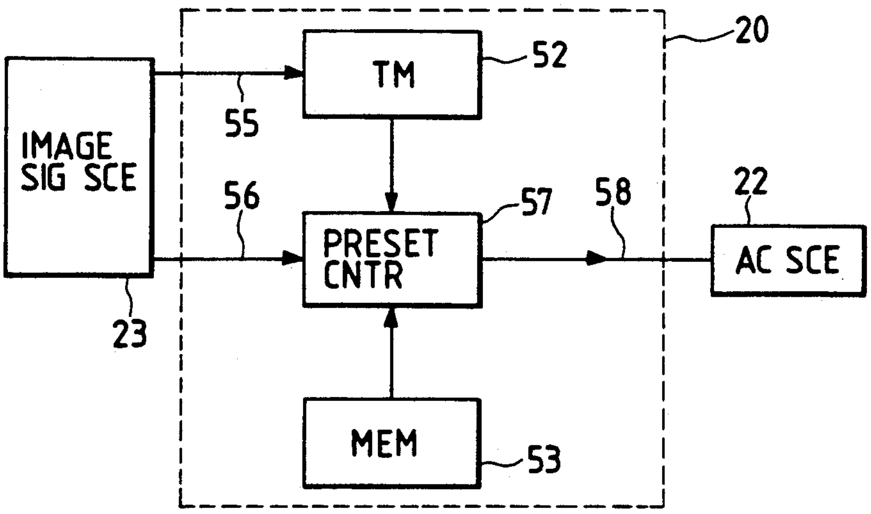
FIG. 4 is a block diagram showing another example of a tuck estimation judgment element which is used in the image formation apparatus according to the present invention.

FIG. 4 is a block diagram showing another tuck estimation judgment element 20 The tuck estimation judgment element 20 comprises a preset counter 57. The other construction elements in this image formation apparatus shown in FIG. 4 are the same as those elements in the image formation apparatus shown in FIG. 3. The reference numbers of like elements in FIG. 4 are the same as those of elements shown in FIG. 3.

In the embodiment shown in FIG. 4, the preset counter 57 counts up from the initial set value and when the present counter 57 reaches the countable maximum value, it produces a ripple carrier signal 58 as an output. This preset counter 57 takes the place of both the counter 51 and the comparator 54 from FIG. 3.

Thus, this embodiment of the tuck estimation judgment means 20 it can carry out same operations as shown in the embodiment of FIG. 3 because it receives the print image signal 56 and can produce the tuck prevention control information.

Further, as the memory 53 it can use a semiconductor memory such as a ROM and a depth switch etc. In a case that when the contents of the memory 53 are constituted to be adjusted by the user. The drum tuck prevention control condition according to each of the image formation apparatus can be set.

In the above stated embodiments of the present invention, as the physical information which is the input to the tuck estimation judgment means 20 is the digital image data which is generated by the image signal source 23. However, it is possible to use other physical information.

Figure 5:
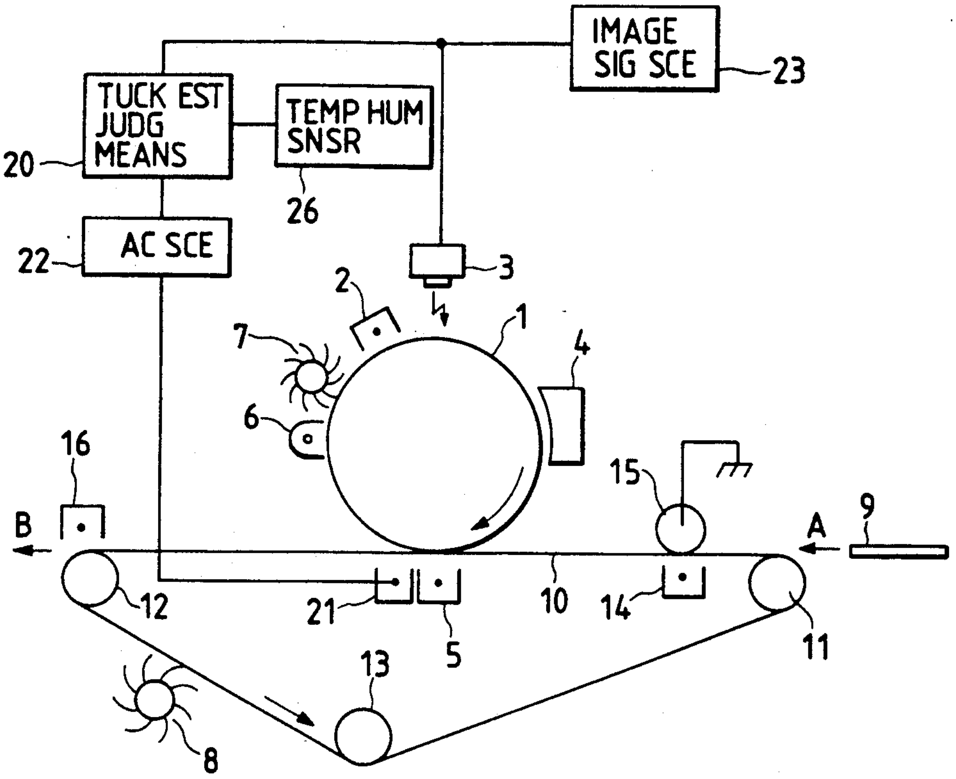
FIG. 5 is a schematic construction view showing a second embodiment of an image formation apparatus having a tuck prevention control means according to the present invention.

FIG. 5 is a schematic construction view showing a second embodiment of an image formation apparatus having a tuck prevention control means according to the present invention. In this second embodiment shown in FIG. 5, the physical information is the digital image data and the temperature and humidity data.

In this second embodiment of the present invention, the physical information is shown to comprise the digital image data and the temperature and humidity data, however it might, in the alternative, use only temperature and humidity data.

The other elements in this image formation apparatus shown in FIG. 5 are same as elements in the image formation apparatus shown in FIG. 1 and where those elements are the same they have the same reference number.

In this second embodiment shown in FIG. 5, the image formation apparatus includes the tuck prevention control means which comprises further a temperature and humidity sensor 26. The temperature and humidity sensor 26 measures the temperature and the humidity surrounding the apparatus main body of the image formation apparatus. The operation of the second embodiment of the present invention shown in FIG. 5 is basically the same as that of the first embodiment of the present invention shown in FIG. 1.

In this second embodiment, the tuck estimation judgment means 20 receives the digital image data generated from the image signal source 23 and the temperature and humidity data from the temperature and humidity sensor 26. The standard of the estimation of whether or not the above digital image data generates the drum tuck in the tuck estimation judgment means 20 is varied or changed in response to the temperature and humidity data.

To put is concretely, the lower the measured values of the temperature and the humidity surrounding the apparatus main body of the image formation apparatus, the more easily the drum tuck occurs, and the standard of the estimation is selected strictly in response to the lowering of those values.

Figure 6:
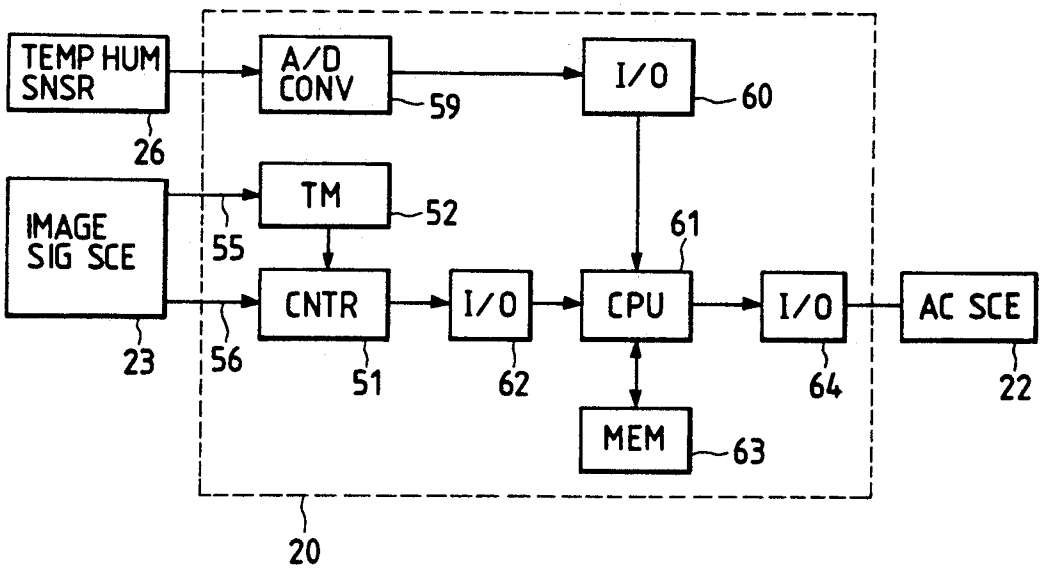
FIG. 6 is a block diagram showing a tuck estimation judgment means which is used in the second embodiment of the image formation apparatus shown in FIG. 5.

FIG. 6 is a block diagram showing one example of a tuck estimation judgment element 20 for use in this second embodiment of the present invention.

In this figure, the tuck estimation judgment element 20 comprises an A/D converter 59, I/O ports 60, 62 and 64, a central processing unit (CPU) 61 and a memory 63. A/D converter 59 converts the data relating to the temperature and humidity, which is generated by the temperature and humidity sensor 26, into a digital signal. The memory 63 stores data for indicating a maximum value of the dot number of the toners for forming the image in which the drum tuck occurs at each temperature and each humidity.

The other elements in this tuck estimation judgment element shown in FIG. 6 are the same as the elements in the tuck estimation judgment element shown in FIG. 3 and where those elements are the same they have the same reference number.

The tuck estimation judgment element 20 of this embodiment according to the present invention carries out the following operation.

The data relating to the temperature and humidity from the temperature and humidity sensor 26 is converted to a digital signal by A/D converter 59 and the digital signal is input into CPU 61 through I/O port 62. The number of "1" data signals (black portions) of the print image signal 56 is input into CPU 61 through I/O port 62.

The number of "1" data signals of the print image signal 56 is obtained by the counter 51 and the timer 52 at a predetermined time which corresponds to the transfer time of the image within the place of about 3 cm from the tip end of the cut paper 9. In this time, CPU 61 refers to a number stored in the memory 63 and finds out whether the value of the detected number is the same as or larger than the number stored in the memory 63.

In CPU 61, when the stored number in the memory 63 is equal or smaller than the arrival number of the print image signal 56, the tuck prevention control information for driving the variable alternating current power source 22 is supplied to the variable alternating current power source 22 through I/O port 64 and the output of the alternating current power source 22 is varied.

This variation in the output may be carried out by the "on" or "off" of the output alternating current in the variable alternating current power source 22 and may be carried out by the value of the output of the alternating current.

Further, it is preferable to prevent deterioration of the transfer material transportation belt 10, by using a small corona current. It is suitable that at each temperature and each humidity the necessary minimum corona electrostatic discharging current value for preventing the occurrence of the drum tuck is obtained in advance by the experimentation. The tuck estimation element can then use the necessary minimum corona electrostatic discharging current value as the stored data in the memory 63.

In this embodiment, the physical data can be the digital image data generated by the image signal source 23 and the data indicating the amount or volume of the residual toners in the development device 4.

For example, in the first embodiment of the present invention shown in FIG. 1, in a case that even drum tuck does not occur through the detection of the digital image data, when the residual toner amount in the development means 4 is small, only a little amount of the toners can adhere to the surface of the photosensitive body drum 1 and as a result the drum tuck may occur.

In the above second embodiment of the present invention, the sensor for detecting the amount of residual toners is disposed in the development means 4. The measurement data obtained from the sensor together with the digital image data are supplied to the tuck estimation judgment element 20. The standard of the estimation for the occurrence of the drum tuck in the digital image data is varied according to the measurement values.

The lower the measurement values the more easily the drum tuck occurs. Thus, according to the lowering degree of the measurement values the standard of the estimation for the occurrence of the drum tuck is selected strictly.

Figure 7:
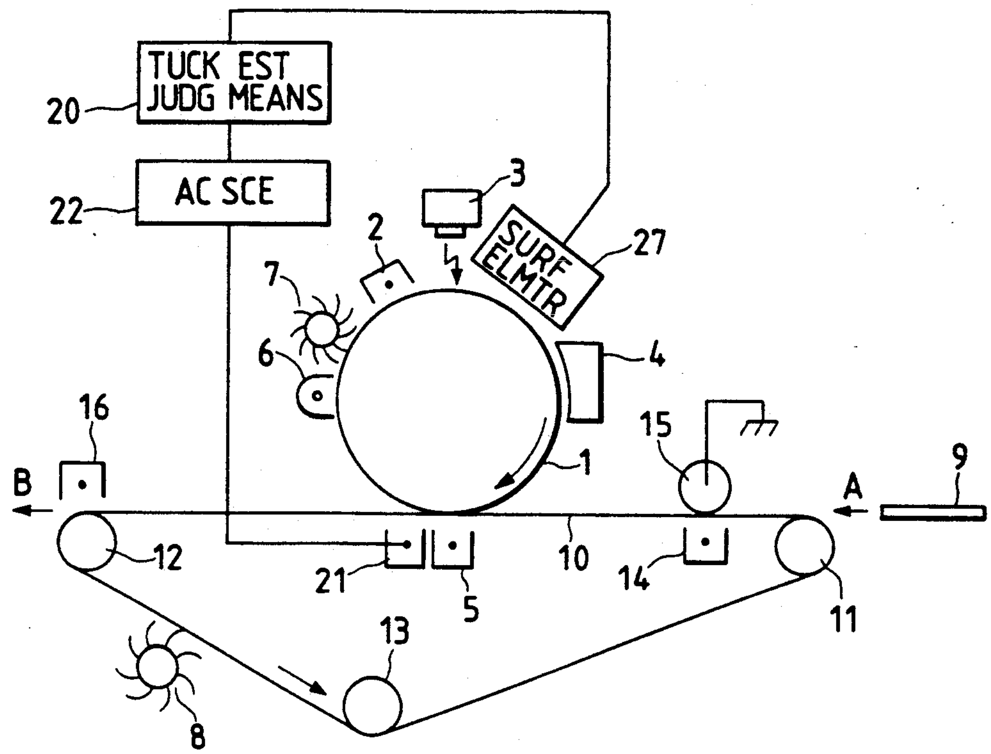
FIG. 7 is a schematic construction view showing a third embodiment of an image formation having a tuck prevention control element according to the present invention.

FIG. 7 is a schematic construction view showing a third embodiment of an image formation apparatus having a tuck prevention control element according to the present invention in which the electrostatic latent image as the physical information is formed on the surface of the photosensitive body drum 1.

A number of the elements in the image formation apparatus shown in FIG. 7 are the same as elements in the image formation apparatus shown in FIG. 1 and those that are the same have the same reference number.

In this third embodiment shown in FIG. 7, the image formation apparatus includes a tuck prevention control element which also includes further a surface electrometer 27. The surface electrometer 27 measures the electrostatic latent image which is formed on the surface of the photosensitive body drum 1.

In this third embodiment according to the present invention, the highly precise surface electrometer 27 can measure the electrostatic latent image having one dot size and is disposed at a vicinity of a portion of the photosensitive body drum 1 between the exposure element 3 and the development element 4. The measurement value measured by the surface electrometer 27 is supplied to the tuck estimation judgment element 20. The operation of the third embodiment is similar to the above first embodiment shown in FIG. 1.

Further, as the surface electrometer 27, when the surface electrometer has the low resolution, it can obtain a wide range and average surface electric potential. Since the value of the surface electric potential is proportional to the ratio of the exposure region against the measurement region, the judgment of the drum tuck occurrence may be carried out with the value of this average surface electric potential.

According to this third embodiment of the image formation apparatus of the present invention, at the conditions that the initial charge electric potential of the photosensitive body drum 1 is −700 V, the last difference in the electric potential is 600 V and the absolute value of the average surface electrostatic potential is above 650 V, when it operates the belt type electrostatic discharger 21, in A4 size cut paper having the ream weight of 55 Kg, it can make the drum tuck occurrence rate at zero.

Figure 8:
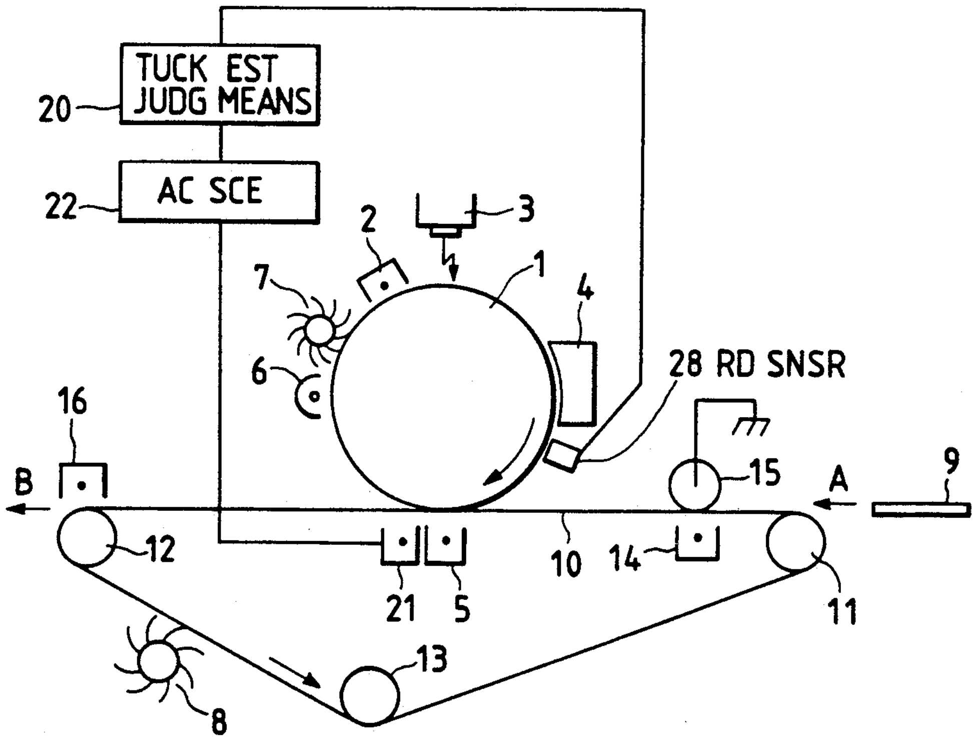
FIG. 8 is a schematic construction view showing a fourth embodiment of an image formation apparatus having a tuck prevention control element according to the present invention.

FIG. 8 is a schematic construction view showing a fourth embodiment of an image formation apparatus having a tuck prevention control element according to the present invention in which the visual image as the physical information is formed on the photosensitive body drum 1.

In this fourth embodiment, the image formation apparatus further includes a reflection type image read sensor 28. The image read sensor 28 is disposed near to the photosensitive body drum 1. A number of the other elements in this image formation apparatus shown in FIG. 8 are the same as elements in the image formation apparatus shown in FIG. 1 and where they are the same they have the same reference number.

The operation in this fourth embodiment of the image formation apparatus shown in FIG. 8 is similar to that of the operation in the first embodiment shown in FIG. 1.

In this fourth embodiment shown in FIG. 8, in a vicinity of the photosensitive body drum 1 the reflection type image read sensor 28 is disposed and the measurement data read by the read sensor 28 is supplied to the tuck estimation judgment element 20. Operation similar to the above first embodiment shown in FIG. 1 is carried out in this image formation apparatus shown in FIG. 8.

In this fourth embodiment, it is desirable to use radiating light that excludes light having the photosensitive wavelength of the photosensitive body drum 1. For the aim of the reduction of the transfer corona current when the radiating light is used as the fade for attenuating the electric charging voltage of the photosensitive body drum 1, the wave-length of the radiating light can be consistent with the photosensitive wave-length of the photosensitive body drum 1.

Further, when the read sensor 28 is a sensor in which the one dot unit can be read on, it is possible to obtain visual image formed on the photosensitive body drum 1 having the one dot unit. Thereby, the operation of this fourth embodiment shown in FIG. 8 is similar to the first embodiment of the present invention shown in FIG. 1.

Besides, when the read sensor 28, is a sensor having low resolution, for example a reflection type densitometer, the reflection light amount from the radiating light which is radiated at the wide range is measured and the mean value of the image density having the wide range can be obtained. In the employment of the low resolution sensor, since the means value of the image density is proportional to the adhere amount of the toners within the measurement region, the judgment of occurrence estimation of a drum tuck can be carried out according to this mean value of the image density.

In the above stated each embodiment of the present invention, a belt type electrostatic discharger 21 is used as the drum tuck prevention member in the drum tuck prevention control element, and the modification of the supply alternating current to the belt type electrostatic discharger 21 or the move of the shutter 24 on the belt type electrostatic discharger 21 is carried out. However, the drum tuck prevention member of the present invention is not limited to the above stated member. A drum tuck prevention member having an other member can be used.

Figure 9:
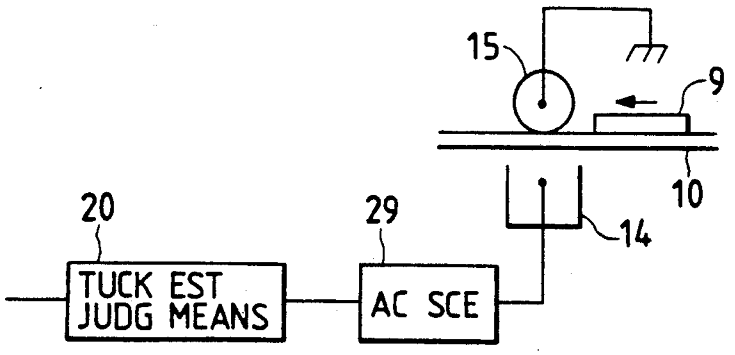
FIG. 9 is a schematic essential construction view showing a fifth embodiment of an image formation apparatus having a tuck prevention control element according to the present invention.

FIG. 9 is a block diagram showing a fifth embodiment of an image formation apparatus having a tuck prevention control means according to the present invention in which a preliminary electrostatic charger 14 is used as the tuck prevention control device.

In this figure, the tuck prevention control device further includes a variable direct current power source 29. The variable direct current power source 29 supplies the direct current to the preliminary electrostatic charger 14.

The other elements in this image formation apparatus shown in FIG. 9 can be the same as those elements in the image formation apparatus shown in FIG. 1 and when they are the same they have the same reference number.

The preliminary electrostatic charger 14 is provided so as to precharge the transfer transportation belt 10 and the cut paper 9. This preliminary electrostatic charger 14 causes the tip end of the cut paper 9 to adhere toward the transfer transportation belt 10 and further lessens the void or gap which is formed between the cut paper 9 and the transfer material transportation belt 10.

In this fifth embodiment, the tuck estimation judgment means 20 estimates the occurrence of the drum tuck. When the tuck prevention control information is an output from the tuck estimation judgment element 20, the tuck prevention control information is biased by the variable direct current power source 29 and according to this bias the variable direct current power source 29 is increased by the generating direct current value and the charging amount of the preliminary electrostatic charger 14, and thereby the occurrence of the drum tuck can be prevented.

In this fifth embodiment, the preliminary electrostatic charger 14 carries out the preliminary charging by a plus corona having the same polarity as the transfer electrostatic charger 5.

Further, in this fifth embodiment, a corona electrostatic charger is used as the preliminary electrostatic charger 14. However, the preliminary electrostatic charger 14 is not limited only to the above stated structure shape, it can be a plate form metal shape.

This plate form metal type preliminary electrostatic charger can work as a roll, pressing down the cut paper 9 to the transfer material transportation belt 10 and further adhering the tip end of the cut paper 9 toward the transfer material transportation belt 10 by giving the direct current from the variable direct current power source 29.

Figure 10:
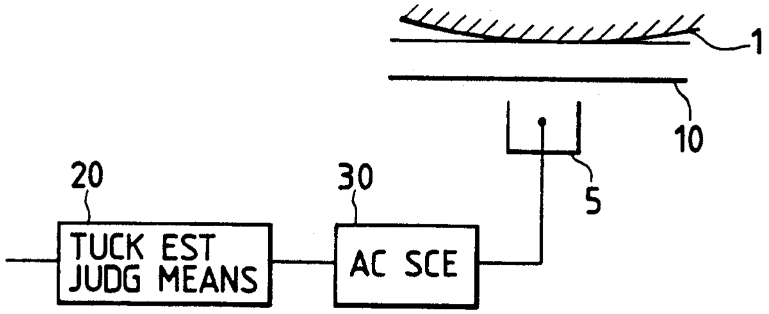
FIG. 10 is a schematic essential construction view showing a sixth embodiment of an image formation apparatus having a tuck prevention control element according to the present invention.

FIG. 10 is a schematic essential construction view showing a sixth embodiment of the image information apparatus according to the present invention in which a transfer electrostatic charger 5 is used as the drum tuck prevention member in the tuck prevention control device.

In this figure, the tuck prevention control device comprises a variable direct current power source 30. The variable direct current power source 30 supplies the direct current to the transfer electrostatic charger 5. The other elements of the sixth embodiment according to the present invention shown in FIG. 10, excluding the variable direct current power source 30, are the same as elements of the first embodiment shown in FIG. 1.

Where the elements are the same, the reference numbers are the same.

In this sixth embodiment, the tuck estimation judgment element 20 estimates the occurrence of the drum tuck. When the tuck prevention control information is produced as an output from the tuck estimation judgment element 20, the tuck prevention control information is made to temporarily stop the output from the variable direct power source 30 or to temporarily weaken the above output. It can reduce the corona current which is supplied to the cut paper 9, thereby it can be prevent the occurrence of the drum tuck.

In this sixth embodiment, when the "on" or "off" control of the corona current against the transfer electrostatic charger 5 is carried out, since it causes a time delay between the control and the change function in the charge of the cut paper 9, it cannot carry out the high speed control.

Accordingly, in the image formation apparatus having high process speed, it is preferable to provide at the transfer electrostatic charger 5 the shutter for opening or closing instantaneously the transfer electrostatic charger 5 and this shutter is closed according to the tuck prevention control information.

Figure 11:
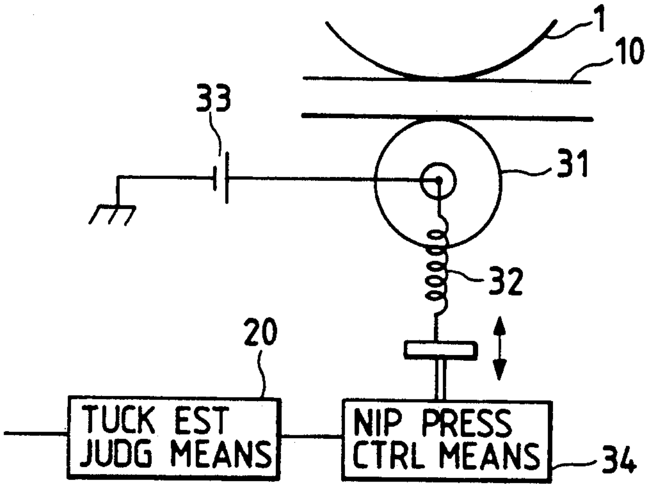
FIG. 11 is a schematic essential construction view showing a seventh embodiment of an image formation apparatus having a tuck prevention control element according to the present invention.

FIG. 11 is a schematic, essentially showing a seventh embodiment of an image formation apparatus having a tuck prevention control device according to the present invention in which a transfer roller 31 disposed in a nip region is used as a tuck prevention member.

In this seventh embodiment, the tuck prevention control device includes the transfer roller 31, a spring member 32, a direct current power source 33 and a nip pressure control device 34. The transfer roller 31 is disposed at the nip region and is made of a semiconductive rubber member. The spring member 32 presses the transfer roller 31, via a roller shaft, toward a side of the transfer material transportation belt 10. The direct current power source 33 charges the transfer roller 31 at the plus electrostatic charging side. The nip pressure control means 34 adjusts the pressing force of the spring member 32.

The other elements of the embodiment according to the present invention shown in FIG. 11 excluding the above portions are the same as elements of the first embodiment shown in FIG. 1.

In this embodiment, the tuck prevention estimation judgment element 20 estimates the occurrence of drum tuck. When the tuck prevention control information is produced as an output from the tuck estimation judgment element 20, that tuck prevention control information temporarily heightens the pressing force of the transfer roller 31 through the nip pressure control means 34 or makes the pressing force zero, and accordingly the occurrence of the drum tuck can be prevented.

Figure 12:
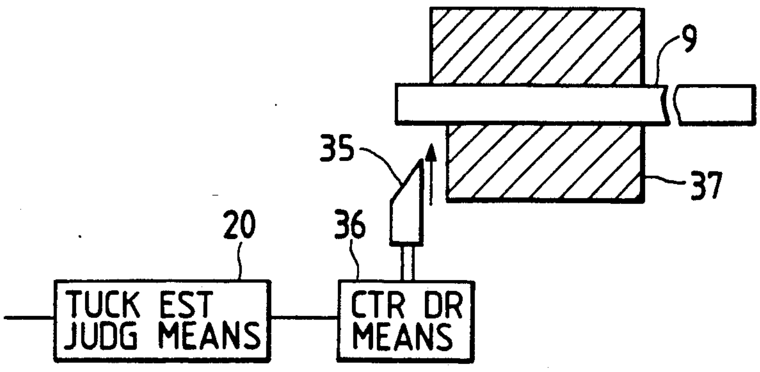
FIG. 12 is a schematic essential construction view showing an eighth embodiment of an image formation apparatus having a tuck prevention control element according to the present invention.

FIG. 12 is a schematic essentially showing an eighth embodiment of an image formation apparatus having a tuck prevention control device according to the present invention in which an element for processing the tip end of the cut paper 9 is used as the tuck prevention control device.

In this eighth embodiment shown in FIG. 12, the tuck prevention control element includes a cutter 35, a cutter drive means 36 and a paper guide 37. The cutter 35 cuts the tip end of the cut paper 9. The cutter drive means 36 is made to move the cutter 35 toward a side of the cut paper 9. The paper guide 37 guides the cut paper 9. The other elements of the eighth embodiment according to the present invention shown in FIG. 12, excluding the above portions, are the same as the elements of the first embodiment shown in FIG. 1.

Before explaining the operation of this eighth embodiment, it will be explained how the processing of the tip end of the cut paper 9 contributes to the prevention of the occurrence of the drum tuck.

Figure 13:
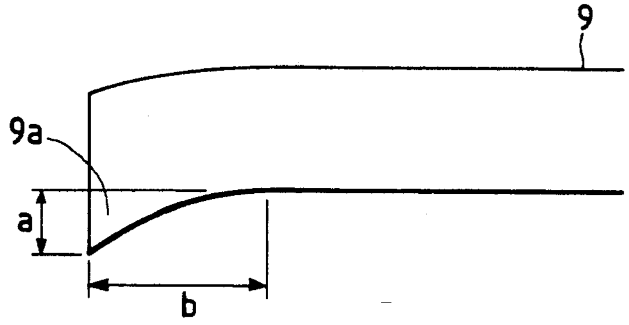
FIG. 13 is an enlarged view showing a droop portion of a cut paper.

In general, each of many cut papers 9 for use in this kind of the image formation apparatus has a droop portion **9*a* as shown in FIG. 13. The droop portion 9*a* of the cut paper 9 is made at the paper cutting operation time. The droop portion 9*a* of the cut paper 9 has a vertical length size (a) and a longitudinal length size (b) as shown in FIG. 13**. In a A4 cut paper of the ream weight of 55 Kg, the vertical length size (a) becomes about more than 30 μm and the longitudinal length size (b) becomes about more than 200 μm.

The inventors of the present invention confirmed following facts by the experimentation. When the cut paper 9 having the droop portion **9*a* at the tip end is mounted on the transfer material transportation belt 10 and is transported toward the nip region, in a case that the droop portion 9*a* faces toward the side of the transfer material transportation belt 10 the drum tuck occurs. However in a case that the droop portion 9*a* faces toward the side of the photosensitive body drum 1** the drum tuck does not occur.

Figure 14:
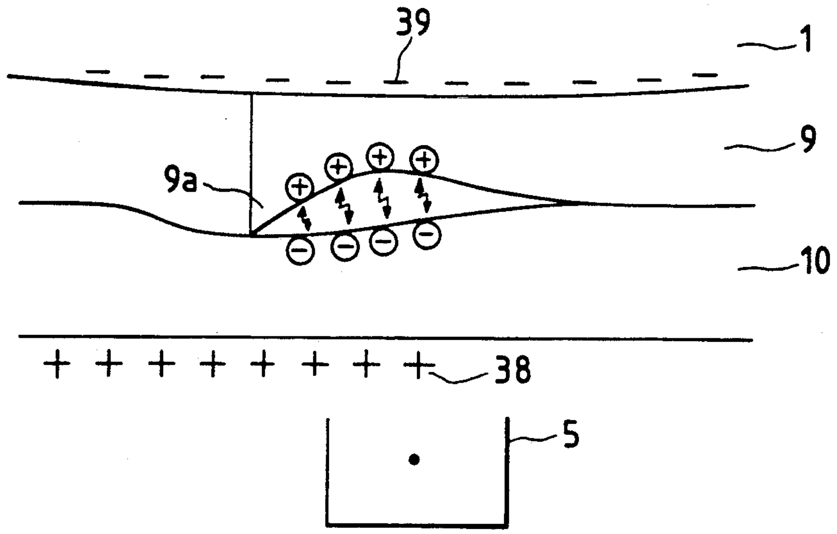
FIG. 14 is an explanatory view showing a relationship between the droop of the cut paper and a transfer material transportation belt.

When the toners do not exist almost in the photosensitive body drum 1 and the droop portion **9*a* of the cut paper 9 is transported to the nip region under the condition the droop portion 9*a* faces on toward the transfer material transportation belt 10, as shown in FIG. 14, a void is made between the cut paper 9 and the transfer material transportation belt 10**.

Further, at the nip region an electric field having the high polarity as shown in figure is generated in the void by the plus electric charging 38 of the transfer electrostatic charger 5 and the minus electric charging 39 of the photosensitive body drum 1. It is thought that by this high electric field the discharge occurs and it becomes the condition in which the tip end of the cut paper 9 is absorbed to the photosensitive body drum 1.

Next, the relationship between the droop portion **9*a* of the cut paper 9 and the evenness of the surface of the cut paper 9** will be explained as follows.

Figure 15:
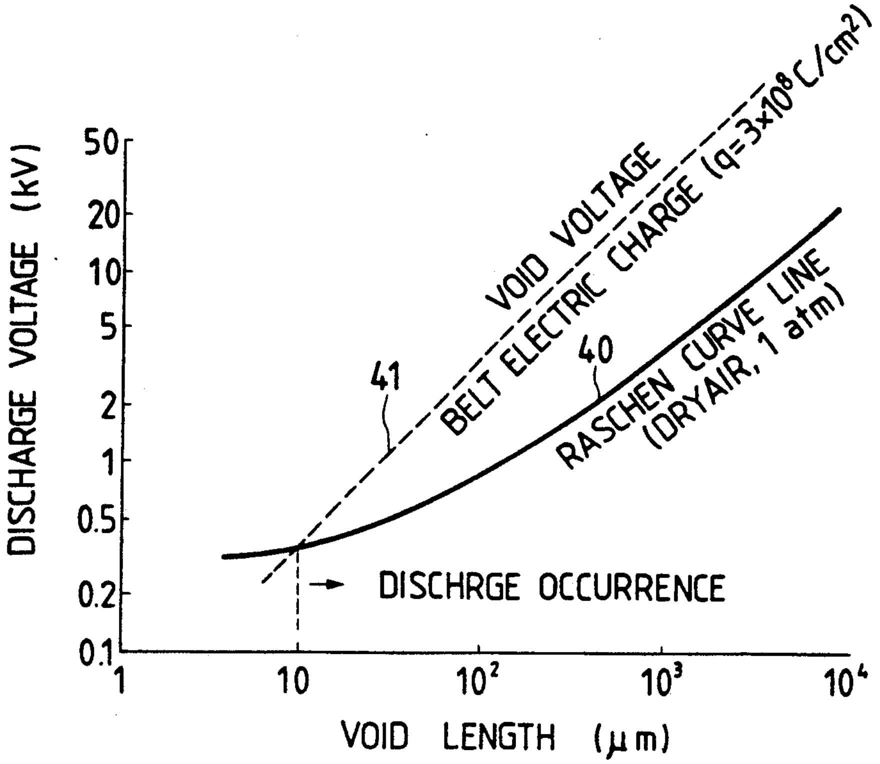
FIG. 15 is a graph showing a relationship between a void length and a discharge voltage in the image formation apparatus.

FIG. 15 is a graph showing a relationship between a Paschen curve line 40 and a curve line 41. The Paschen curve line 40 shows a relationship between the discharge start voltage in air and the void length. The curve line 41 shows a relationship between the void and the void voltage when suitable charge is given to the transfer material transportation belt 10. In this graph, discharge occurs at the portion in which the void length is larger than the void length (about 10 μm) for the intersection point of both curve lines 40 and 41.

For reference, it will be confirmed that the evenness of the cut paper 9 has a size of about several μm and the droop portion **9*a* of the cut paper 9 has a size of about more than 30 μm according to FIG. 15**.

In A4 size cut paper having the ream weight of 55 Kg, when the evenness in the surface of the cut paper 9 is measured, it can confirm that the largeness of the surface evenness is about several μm order at the most. Accordingly, taking account of the contents expressed by the graph and the actual measurement values of the droop portion **9*a* of the cut paper 9 and the surface evenness in the cut paper 9, it is understood that discharging occurs only at the void portion made by the droop portion 9*a* of the cut paper 9. As a result, it can understand that only droop 9*a* of the cut paper 9** becomes the cause for the occurrence of the drum tuck.

Figure 16:
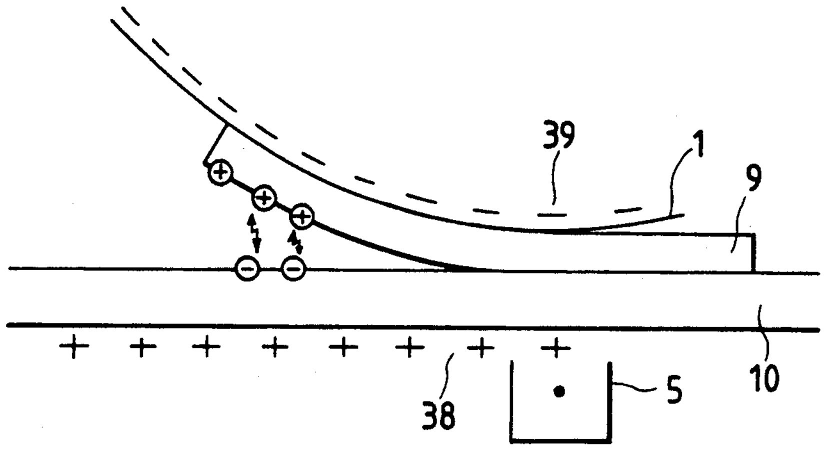
FIG. 16 is an explanatory view showing a condition in which the cut paper pulls out from a nip region in the image formation apparatus.

FIG. 16 is an explanatory view showing the condition in which the cut paper 9 gets out of the nip region.

In this figure, in a case that the toners do not hardly exist on the photosensitive body drum 1, in other words when much minus electrostatic charging exists on the photosensitive body drum 1, under the condition in which the tip end of the cut paper 9 adheres to the photosensitive body drum 1, the tip end of the cut paper 9 is pulled up from the transfer material transportation belt 10.

In the above condition, since it causes peeling discharging as shown in this figure and this peeling discharging charges electrostatic at a plus side, the portion excluding the tip end of the cut paper 9, it can be understood that drum tuck occurs frequently.

In a case that many toners do exist on the photosensitive body drum 1, in other words when the minus electrostatic charging does not hardly exist on the photosensitive body drum 1, the toners are pulled to the transfer material transportation belt 10 through the cut paper 9.

By the existence of the toners, since the interval between the photosensitive body drum 1 and the cut paper 9 is made large, the attraction force for attracting the plus electrostatic charging of the tip end of the cut paper 9 is weakened, accordingly it can be understood that the frequency of occurrence of drum tuck lessens.

In this embodiment of the present invention, the droop portion 9*a* of the cut paper 9 for causing the occurrence of the drum tuck is processed and deformed to a certain degree in which the droop portion 9*a* of the cut paper 9 does not cause the occurrence of drum tuck. Before the cut paper 9 is mounted on the transfer material transportation belt 10, the tip end of the cut paper 9 has been cut by the cutter 35 to form the droop portion 9*a* of the cut paper 9 at a direction so as to avoid drum tuck.

When the tuck estimation judgment element 20 estimates the occurrence of the drum tuck and the tuck prevention control information is provided as an output from the tuck estimation judgment element 20, the tuck prevention control information causes the outer 35 to move toward the side of the cut paper 9 thanks to the cutter drive means 36.

Then the tip end of the cut paper 9 is cut by the cutter 35 at the direction so as to avoid the droop portion 9*a* of the cut paper 9, accordingly the occurrence of the drum tuck is prevented.

In this embodiment of the present invention, the cutter 35 is used as a means for processing the tip end of the cut paper 9 and the tip end of the cut paper 9 is cut to form the droop portion 9*a* at a predetermined direction.

However, in replace of the cutter 35, it is possible to employ an element for folding the tip end of the cut paper 9. In this embodiment, when the tuck estimation judgment element 20 estimates the occurrence of the drum tuck and the tuck prevention control information is produced as output from the tuck estimation judgment element 20, the tuck prevention control information is made to drive the tuck prevention element to fold the tip end of the cut paper 9, and accordingly the occurrence of the drum tuck is prevented from occurring.

Figure 17:
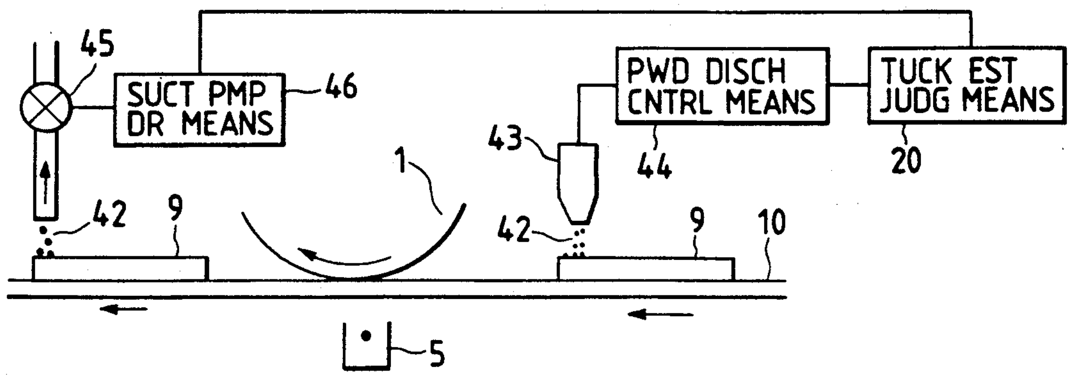
FIG. 17 is a schematic essential construction view showing a ninth embodiment of an image formation apparatus having a tuck prevention control element according to the present invention.

FIG. 17 is a schematic essentially showing a ninth embodiment of the present invention in which the means for adhering the powder at the tip end of the cut paper 9 is used as the drum tuck control member.

In this ninth embodiment shown in FIG. 17, the tuck prevention control element includes a powder body 42 such as a silica powder, a powder body discharge element 43, a powder body discharge control element 44, a suction pump 45 and a suction pump drive means 46.

The powder body 42 is adhered to the tip end of the cut paper 9 and the powder body discharge element 43 receives the powder body 42 and discharges the powder body 42 to the tip end of the cut paper 9. The powder body discharge control element 44 drives the powder body discharge element 43, the suction pump 45 sucks the used powder body 42 and the suction pump drive element 46 drives the suction pump 45.

The other elements excluding the above stated elements of the ninth embodiment shown in FIG. 17 are same as elements of the first embodiment shown in FIG. 1.

The operations of this ninth embodiment of the present invention will be explained as follows. When the tuck estimation judgment element 20 estimates the occurrence of drum tuck and the tuck prevention control information is provided as an output from the tuck estimation judgment element 20, the tuck prevention control information temporarily drive the powder body discharge element 43 through the powder body discharge control element 44.

The powder body discharge element 43 discharges the powder body 42 at the tip end of the cut paper 9 which is transported by mounting it on the transfer material transportation belt 10 and adheres the powder body 42 to the tip end of the cut paper 9, accordingly the occurrence of the drum tuck can be prevented from occurring.

The tuck estimation judgment element 20 outputs a drive signal in accompaniment with the tuck prevention control information. The drive signal temporarily drives the suction pump 45 through the suction pump drive element 46 and the suction pump 45 removes, by sucking, the used powder body 42 which is adhered on the tip end of the cut paper 9.

In this ninth embodiment, the photosensitive body drum 1 is charged electrostatic at a minus side and in a case of the employment of the reversal development system it is preferable to electrostatically charge the powder body 42 at a minus side.

Further, in a case that the powder body 42 has a color similar to the color of the transfer material (the cut paper) 9 and the powder body 42 is fixed in accompany with the toners, it can dispense the removal process for the powder body 42.

In the above stated various embodiments of the image formation apparatus according to the present invention, the selection of the physical information relating to the occurrence of the drum tuck and the selection of the drum tuck prevention control element can be suitably made in response to the cause of the occurrence of the drum tuck.

For example, in a case when the predominant cause of drum tuck is the droop portion 9*a* of the cut paper 9, it is preferable to use the means for processing the tip end of the cut paper 9 as the drum tuck prevention control member.

Further, in a case when the predominant cause of drum tuck the image condition of the cut paper 9, it is preferable to use the digital image data that is used for exposing the image holding body (the photosensitive body drum) and the data relating to the temperature and the humidity detected in the apparatus main body of the image formation apparatus as the physical information relating to the occurrence of the drum tuck.

By using the structures shown in the above stated embodiments of the present invention, in each embodiment it does not accompany with the inferior in the image and further the occurrence of the drum tuck can be prevented from occurring.

Figure 18:
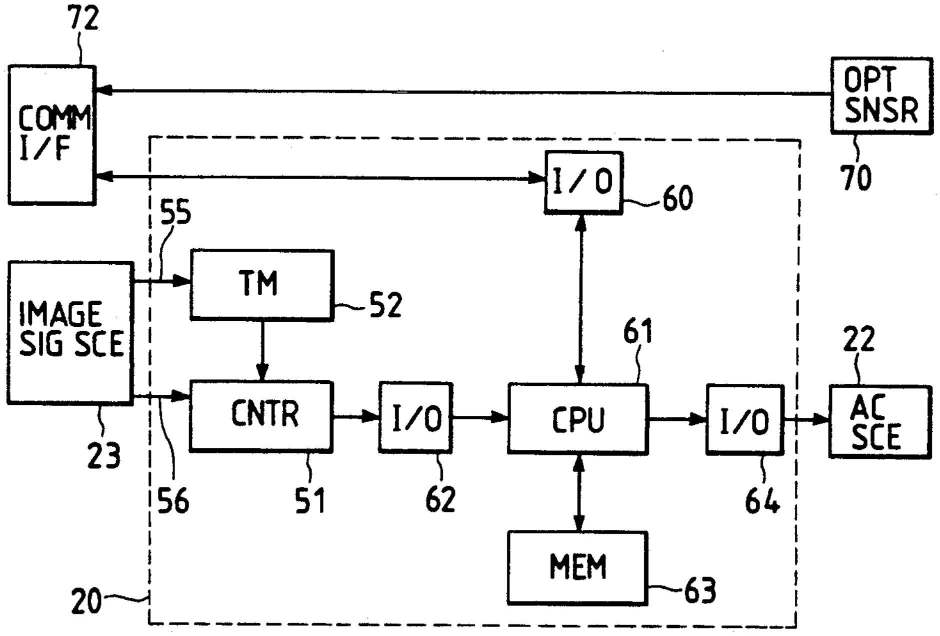
FIG. 18 is a block diagram showing a remote controllable tuck estimation judgment element used in the image formation apparatus according to the present invention.
Figure 19:
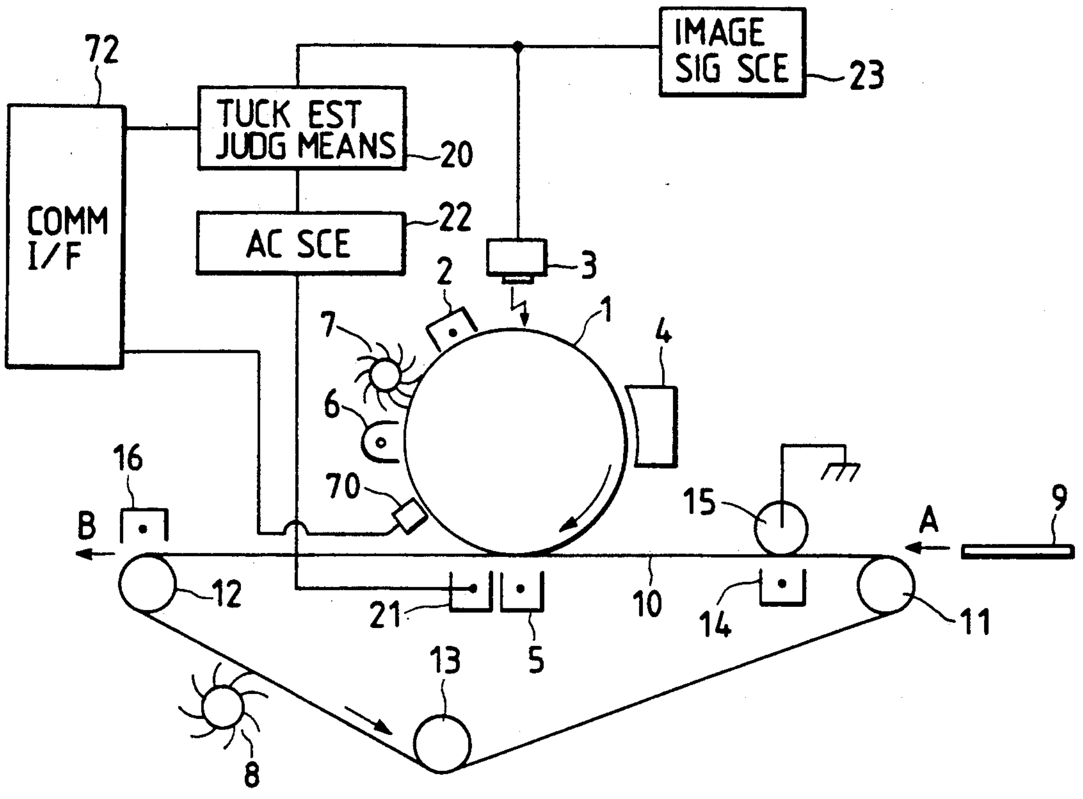
FIG. 19 is a schematic construction view showing an image formation apparatus having a tuck prevention control element according to the present invention in which the tuck estimation judgment element shown in FIG. 18 is used.
Figure 20:
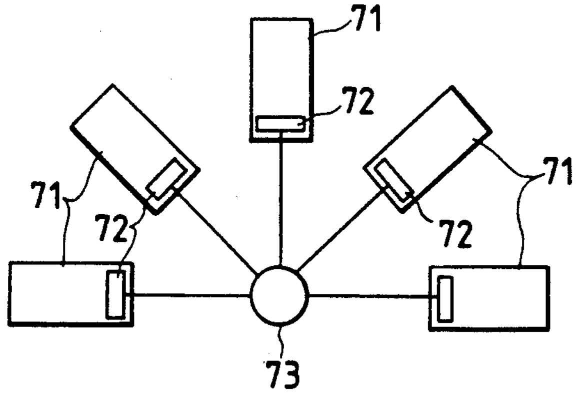
FIG. 20 is a block diagram showing a combination network system in which plural image formation apparatuses are combined together with a centralized control center.

FIG. 18 is a block diagram showing one example of an adjustment element for remotely adjusting the store value of the memory in the tuck estimation judgment element 20. FIG. 19 is a schematic showing an image formation apparatus used together with the adjustment means shown in FIG. 18. FIG. 20 is a block diagram showing an example of a combination net work in which plural image formation apparatuses according to the present invention are combined together with.

In these figures, the combination network comprises an optical sensor 70, plural image formation apparatuses 71 according to the present invention, a communication interface 72 and a centralized control center 73. The optical sensor 70 is disposed near the photosensitive body drum 1 arranged between the nip region and the erase lamp 6. The communication interface 72 is combined to the respective image formation apparatus 7 and the centralized control center 73 controls the respective image formation apparatus 71.

The other elements, excluding the above stated elements of this embodiment shown in FIGS. 18, 19 and 20, are the same as elements of the first embodiment shown in FIG. 1 and the second embodiment shown in FIG. 6.

In this combination network shown in FIG. 20, more than on image formation apparatus 71 is constructed to combine to the centralized control center 73 through the communication interface 72 and the communication electric lines.

The construction of the tuck estimation judgment element 20 shown in FIG. 18 is similar to the construction of the tuck estimation judgment element 20 shown in FIG. 6. The operation of the tuck estimation judgment element 20 shown in FIG. 18 is as follows.

After the print start signal 55 is triggered from the image signal power source 23 a time is set in the timer 52. Such a time corresponds to the time for transferring the image which exists at the portion within about 3 cm from the tip end of the cut paper 9. The number of the "1" data signals (black portions) within the set time of the timer 52 of the print image signal 56 is counted and the number is an input into CPU 61 through I/O port 62.

In this time, CPU 61 refers to the number stored in the memory 63. When the stored number in the memory 63 is the same as or smaller than the number of the "1" data signals of the print image signal 56, CPU 61 supplies to the drum tuck prevention control information for turning "on" the variable alternating current power source 22 through I/O port 64.

In this time, the information for indicating "on" or "off" of the variable alternating current power source 22 is sent to the centralized control center 73 through I/O port 60, the communication interface 72 and the communication electric lines. When the optical sensor 70 detects the occurrence of the drum tuck in the image formation apparatus 71, this detection information is sent to the centralized control center 73 through the communication interface 72 and the communication electric lines.

Therefore, in the centralized control center 73 according to the above stated two informations, it can recognize the working condition and the effect of the drum tuck prevention control means in each image formation apparatus 71.

In the centralized control center 73, on the basis of the above results, the stored number in the memory 63 can be reset according to demand. According to the conditions of each image formation apparatus 71 it can reset and replace the estimation value of the occurrence of the drum tuck to the most suitable value.

Further, by the above stated reset in the centralized control center 73, the occurrence of the drum tuck can be restrained to the utmost. However, when the occurrence the drum tuck is not prevented a service man can adjust and mend the respective image formation apparatus 71 and thereby the effective centralized control for the image formation apparatus can be carried out.

We claim:

1. An image information formation apparatus having a tuck prevention control element comprising:
- an image holding body;
- an image formation device adapted to form a visual image on said image holding body;
- a transfer material transportation element supporting a transfer material and adapted to transport said transfer material to a transfer region;
- a transfer device adapted to transfer said visual image formed on said image holding body to said transfer material; and
- a tuck prevention control element adapted to prevent said image holding body from supporting and transporting said transfer material after said transfer material has passed through said transfer region; wherein
- said tuck prevention control element includes a tuck estimation judgment element, and
- said tuck estimation judgment element detects various kinds of physical information relating to an occurrence of a tuck along a longitudinal direction of said transfer material and generates tuck control prevention information in response to said physical information.

2. The image formation apparatus having a tuck prevention control element according to claim 1, wherein said physical information relating to the tuck occurrence is digital data for exposing said image holding body.

3. The image formation apparatus having a tuck prevention control element according to claim 1, wherein said physical information relating to the tuck occurrence includes temperature and humidity data detected in an interior of an apparatus main body of the image information apparatus.

4. The image formation apparatus having a tuck prevention control element according to claim 1, wherein said physical information relating to the tuck occurrence include digital data for exposing said image holding body and temperature and humidity data detected in an interior of an apparatus main body of the image information apparatus.

5. The image formation apparatus having a tuck prevention control element according to claim 1, wherein said physical information relating to the tuck occurrence includes data for indicating a residual amount of a development element of the image information apparatus.

6. The image formation apparatus having a tuck prevention control element according to claim 1, wherein said physical information relating to the tuck occurrence include digital data for exposing said image holding body and data for indicating a residual amount of a development element of the image information apparatus.

7. The image formation apparatus having a tuck prevention control element according to claim 1, wherein said physical information relating to the tuck occurrence includes data for indicating an electrostatic latent image which is formed on a surface of said image holding body.

8. The image formation apparatus having a tuck prevention control element according to claim 1, wherein said physical information relating to the tuck occurrence includes data for indicating a visual image which is formed on a surface of said image holding body.

9. The image formation apparatus having a tuck prevention control element according to claim 1, wherein said tuck prevention control information is a control signal of a variable alternating current power source for driving an electrostatic discharger which is disposed on said transfer device.

10. The image formation apparatus having a tuck prevention control element according to claim 1, wherein said tuck prevention control information is a control signal of a shutter open-close device for opening or closing a shutter of a variable alternating current power source for driving an electrostatic discharger which is disposed on said transfer device.

11. The image formation apparatus having a tuck prevention control element according to claim 1, wherein said tuck prevention control information is a control signal of a variable alternating current power source for driving an electrostatic discharger which is disposed on said transfer device.

12. The image formation apparatus having a tuck prevention control element according to claim 1, wherein said tuck prevention control information is a control signal of a variable alternating current power source for driving a preliminary electric charger.

13. The image formation apparatus having a tuck prevention control element according to claim 1, wherein said tuck prevention control information is a control signal of a nip pressure control device for adjusting a pressing force of a transfer roller which is contacted to a transfer belt.

14. The image formation apparatus having a tuck prevention control element according to claim 1, wherein said tuck prevention control information is a drive control signal of a processing device for processing a tip end of said transfer material.

15. The image formation apparatus having a tuck prevention control element according to claim 14, wherein said processing device carries out a cutting process on said tip end of said transfer material.

16. The image formation apparatus having a tuck prevention control element according to claim 14, wherein said processing device carries out a folding process on said tip end of said transfer material.

17. The image formation apparatus having a tuck prevention control element according to claim 1, wherein said tuck prevention control information is a control signal of a powder body discharge control device driving a power body discharge element which adheres a powder body at a tip end of said transfer material.

18. The image formation apparatus having a tuck prevention control element according to claim 17, wherein a color of said powder body is the same as a color of said transfer material.

19. An image formation apparatus having a drum tuck prevention control element comprising:

a photosensitive body drum;

an image formation device adapted to form a visual image on said photosensitive body drum said image formation device including an electrostatic discharger;

an exposure device;

a development element;

a cut paper transportation belt adapted to support and transport a cut paper to a transfer region;

a transfer electrostatic element adapted to transfer said visual image which is formed on said photosensitive body drum to said cut paper; and a drum tuck prevention control element adapted to prevent said photosensitive body drum from supporting and transporting said cut paper after said cut paper has passed through said transfer region; wherein said drum tuck prevention control element includes a tuck estimation judgment element, and said tuck estimation judgment element detects various kinds of physical information relating to an occurrence of a tuck along a longitudinal direction of said cut paper and generates tuck control prevention information in response to said physical information.

20. The image formation apparatus having a drum tuck prevention control element according to claim 19, wherein said physical information relating to the tuck occurrence includes digital data for exposing said photosensitive body drum.

21. The image formation apparatus having a drum tuck prevention control element according to claim 19, wherein said physical information relating to the tuck occurrence includes temperature and humidity data detected in an interior of an apparatus main body of the image information apparatus.

22. The image formation apparatus having a drum tuck prevention control element according to claim 19, wherein said physical information relating to the tuck occurrence includes digital data for exposing said photosensitive body drum and a temperature and humidity data detected in an interior of an apparatus main body of the image information apparatus.

23. The image formation apparatus having a drum tuck prevention control element according to claim 19, wherein said physical information relating to the tuck occurrence includes data for indicating a residual amount of a development element of the image information apparatus.

24. The image formation apparatus having a drum tuck prevention control element according to claim 19, wherein said physical information relating to the tuck occurrence includes digital data for exposing said photosensitive body drum and data for indicating a residual amount of a development element of the image information apparatus.

25. The image formation apparatus having a drum tuck prevention control element according to claim 19, wherein said physical information relating to the tuck occurrence includes data for indicating an electrostatic latent image which is formed on a surface of said photosensitive body drum.

26. The image formation apparatus having a drum tuck prevention control element according to claim 19, wherein said physical information relation to the tuck occurrence includes data for indicating a visual image which is formed on a surface of said photosensitive body drum.

27. A network comprising a centralized control center, an image formation apparatus and a communication interface wherein said image formation apparatus includes a drum tuck prevention control element, wherein the image formation apparatus receives information relating to a drum tuck prevention from said centralized control center and modifies suitably a condition for preventing the drum tuck of a transfer material along a longitudinal direction of said transfer material in response to said received information.

28. A network comprising a centralized control center, a plurality of image formation apparatuses, each having a tuck prevention control element, and a communication interface, wherein said centralized control center receives an information relating to a tuck prevention from each image formation apparatus and modifies suitably a condition for preventing the tuck of a transfer material along a longitudinal direction of said transfer material in every image formation apparatus in response to said received information.

* * * * *

UNITED STATES PATENT AND TRADEMARK OFFICE

CERTIFICATE OF CORRECTION

PATENT NO. : 5,291,228

DATED : March 1, 1994

INVENTOR(S) : Nagata Tetsuya, et al

It is certified that error appears in the above-indentified patent and that said Letters Patent is hereby corrected as shown below:

| Column | Line | |
|---|---|---|
| 2 | 29 | Change "craw" to --claw--. |
| 2 | 30 | Change "are same those" to --are the same as those--. |
| 2 | 47 | After "with" change "o" to --or--. |
| 2 | 64 | Change "where" to --wherein--. |
| 2 | 65 | After "117" insert --is--. |
| 3 | 13 | After "must" delete "to". |
| 3 | 23 | After "example" insert --,--. |
| 3 | 24 | After "material" insert --,--. |
| 3 | 27 | Change "many drum tucks occur" to --the more drum tucks tend to occur.-- |

UNITED STATES PATENT AND TRADEMARK OFFICE
CERTIFICATE OF CORRECTION

PATENT NO. : 5,291,228

DATED : March 1, 1994

INVENTOR(S) : Nagata Tetsuya, et al

It is certified that error appears in the above-indentified patent and that said Letters Patent is hereby corrected as shown below:

| Column | Line | |
|---|---|---|
| 3 | 33-35 | Change "A case that the adhere amount of the image formation medium (toners) does not have many on the photosensitive body drum." to --A case where very little image formation medium (toners) adheres to the photosensitive drum.-- |
| 3 | 37-39 | Change "the image becomes to have much no toner adhesion portion in the cut paper used as the transfer material;" to --the image is affected by having very little toner adhering to the cut paper used as the transfer material;-- |

UNITED STATES PATENT AND TRADEMARK OFFICE
CERTIFICATE OF CORRECTION

PATENT NO. : 5,291,228
DATED : March 1, 1994
INVENTOR(S) : Nagata Tetsuya, et al It is certified that error appears in the above-indentified patent and that said Letters Patent is hereby corrected as shown below:

| Column | Line | |
|---|---|---|
| 4 | 1 | After "is" change "t" to --to--. |
| 4 | 49 | Change "from transporting" to --the transporting of--. |
| 4 | 60 | After "data" delete "v". |
| 4 | 61 | Change "a" to --an--. |
| 5 | 1 | Change "a" to --an--. |
| 5 | 8 | After "of" delete "a". |
| 6 | 6 | Change "grasped" to --evaluated--. |
| 6 | 7 | Change "grasp" to --evaluation,--. |
| 6 | 11 | Change "arranged" to --summoned--. |
| 6 | 38 | After "formation" insert --apparatus--. |

UNITED STATES PATENT AND TRADEMARK OFFICE
CERTIFICATE OF CORRECTION

PATENT NO. : 5,291,228

DATED : March 1, 1994

INVENTOR(S) : Nagata Tetsuya, et al.

It is certified that error appears in the above-indentified patent and that said Letters Patent is hereby corrected as shown below:

| Column | Line | |
|---|---|---|
| 7 | 59 | Change "2i" to --21--. |
| 7 | 60 | After "charger 5" delete "and". |
| 7 | 68 | After "basically" insert --the--; after "same" change "to" to --as--. |
| 8 | 10 | Change "easy" to --likely--. |
| 8 | 44 | Before "hap-" insert --it--. |
| 9 | 32 | Change "Of" to --of--. |
| 9 | 60 | Before "use" delete "to"; after "use" insert --of--. |
| 10 | 10 | Change "means 20 it" to --element 20--; after "out" insert --the--. |

UNITED STATES PATENT AND TRADEMARK OFFICE

CERTIFICATE OF CORRECTION

PATENT NO. : 5,291,228

DATED : March 1, 1994

INVENTOR(S) : Nagata Tetsuya, et al.

It is certified that error appears in the above-indentified patent and that said Letters Patent is hereby corrected as shown below:

| Column | Line | |
|---|---|---|
| 10 | 15 | After "In" change "a" to --the--. |
| 10 | 16 | After "case" delete "that". |
| 10 | 17 | Change "user. The" to --user, the--. |
| 10 | 63 | Change "is" to --it--. |
| 11 | 57 | After "by" delete "the". |
| 12 | 45 | After "as" insert --to--. |
| 12 | 62 | After "rate" change "at" to --fall to--. |
| 13 | 43 | Change "means value" to --mean value--. |
| 13 | 57 | Change "an other" to --another--. |
| 14 | 65-66 | Delete "it can be prevent" and insert --preventing--. |

UNITED STATES PATENT AND TRADEMARK OFFICE

CERTIFICATE OF CORRECTION

PATENT NO. : 5,291,228

DATED : March 1, 1994

INVENTOR(S) : Nagata Tetsuya, et al.

It is certified that error appears in the above-indentified patent and that said Letters Patent is hereby corrected as shown below:

| Column | Line | |
|---|---|---|
| 16 | 5 | Before "following" insert --the--. |
| 16 | 14 | After "When" delete "the toners donot exist almost in" and insert therefor --negligible amounts of toners are present on--. |
| 16 | 21 | After "having" change "the" to --a--. |
| 16 | 22 | Before "figure" insert --the--. |
| 16 | 57 | Change "understand" to --be understood--. |
| 16 | 61-62 | Change "that the toners do not hardly exist" to --where negligible amounts of toners are present--. |

UNITED STATES PATENT AND TRADEMARK OFFICE

CERTIFICATE OF CORRECTION

PATENT NO. : 5,291,228

DATED : March 1, 1994

INVENTOR(S) : Nagata Tetsuya, et al.

It is certified that error appears in the above-indentified patent and that said Letters Patent is hereby corrected as shown below:

| Column | Line | |
|---|---|---|
| 17 | 8 | Change "does not hardly exist" to --occurs only slightly--. |
| 17 | 33 | Change "outer 35" to --cutter 35--. |
| 17 | 44 | Change "replace" to --place--. |
| 18 | 13 | Change "drive" to --drives--. |
| 18 | 31 | Change "electrostatic" to --electrostatically--. |
| 18 | 37 | Change "accompany" to --accompanyment--. |
| 18 | 53 | After "tuck" insert --is--. |

UNITED STATES PATENT AND TRADEMARK OFFICE

CERTIFICATE OF CORRECTION

PATENT NO. : 5,291,228

DATED : March 1, 1994

INVENTOR(S) : Nagata Tetsuya, et al.

It is certified that error appears in the above-indentified patent and that said Letters Patent is hereby corrected as shown below:

| Column | Line | |
|---|---|---|
| 18 | 62-63 | Delete "it does not accompany with the inferior in the image" and insert therefor --inferior images are prevented--. |
| 19 | 3 | Change "net work" to --network--. |
| 19 | 5 | Delete "with". |
| 19 | 22 | Change "on" to --one--. |
| 19 | 41 | Change "In" to --At--. |
| 22 | 60 | Change "relation" to --relating--. |

Signed and Sealed this

Twenty-seventh Day of September, 1994

Attest:

Bruce Lehman

BRUCE LEHMAN

*Attesting Officer*

*Commissioner of Patents and Trademarks*